(12) United States Patent
Dubois

(10) Patent No.: US 9,574,872 B2
(45) Date of Patent: Feb. 21, 2017

(54) SYSTEM AND METHOD FOR OPTICAL READING OF MARKINGS PRINTED ON A FACE OF AN OPHTHALMIC LENS

(71) Applicant: Frederic Dubois, Charenton-le-Pont (FR)

(72) Inventor: Frederic Dubois, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 427 days.

(21) Appl. No.: 14/365,271

(22) PCT Filed: Nov. 28, 2012

(86) PCT No.: PCT/FR2012/052739
§ 371 (c)(1),
(2) Date: Jun. 13, 2014

(87) PCT Pub. No.: WO2013/088021
PCT Pub. Date: Jun. 20, 2013

(65) Prior Publication Data
US 2015/0002656 A1    Jan. 1, 2015

(30) Foreign Application Priority Data

Dec. 15, 2011    (FR) .................................... 11 61729

(51) Int. Cl.
| | |
|---|---|
| *H04N 7/18* | (2006.01) |
| *G01B 11/14* | (2006.01) |
| *G01M 11/02* | (2006.01) |

(52) U.S. Cl.
CPC ......... *G01B 11/14* (2013.01); *G01M 11/0207* (2013.01); *G01M 11/0214* (2013.01); *G01M 11/0278* (2013.01)

(58) Field of Classification Search
CPC .............. G01B 11/14; G01M 11/0214; G01M 11/0207; G01M 11/0278
See application file for complete search history.

(56) References Cited

U.S. PATENT DOCUMENTS

| | | | | |
|---|---|---|---|---|
| 5,627,638 A | * | 5/1997 | Vokhmin | ........... G01M 11/0278 250/223 B |
| 5,801,822 A | * | 9/1998 | Lafferty | ............. G01M 11/0207 356/124 |

(Continued)

FOREIGN PATENT DOCUMENTS

| | | |
|---|---|---|
| DE | 103 33 426 A1 | 2/2005 |
| FR | 2 825 466 A | 12/2002 |

(Continued)

OTHER PUBLICATIONS

International Search Report, dated Mar. 13, 2013, from corresponding PCT application.

*Primary Examiner* — Sath V Perungavoor
*Assistant Examiner* — Xiaolan Xu
(74) *Attorney, Agent, or Firm* — Young & Thompson

(57) ABSTRACT

A system for the optical reading of markings printed on an ophthalmic lens (2), includes an image capture device (26), a light source (15) and a support (18, 31) which are configured so that, when the lens is received by the support with a masking element (39) which covers the markings, the source illuminates the lens while rendering the markings visible to the device; and a mobile element on which the source is fixed and which admits a retracted position where it is distanced from the support and a working position where it surrounds at least partially the support and the source looks at the support and these latter are configured so that the source illuminates a rim (34) of the lens so that the (Continued)

Figure 1:
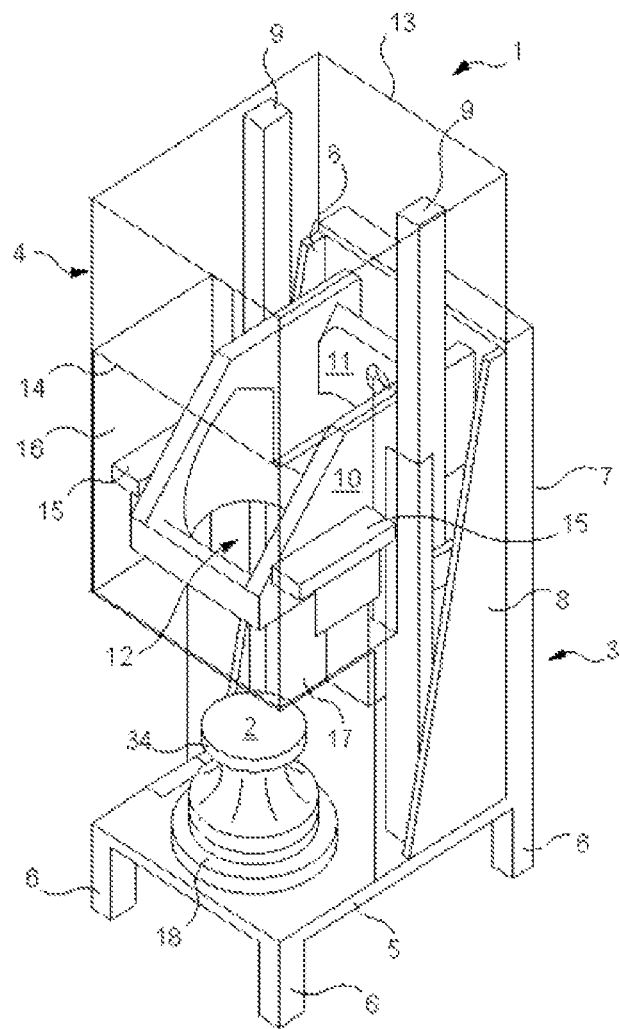

light penetrates into its mass (35) and reaches the masking element (33) through the lens.

16 Claims, 4 Drawing Sheets

(56) References Cited

U.S. PATENT DOCUMENTS

| | | |
|---|---|---|
| 2005/0259247 A1 | 11/2005 | Cyr et al. |
| 2008/0062410 A1* | 3/2008 | Divo ................. G01M 11/0228 356/126 |

FOREIGN PATENT DOCUMENTS

| | | |
|---|---|---|
| FR | 2 871 100 A | 12/2005 |
| WO | 95/01558 A1 | 1/1995 |
| WO | 95/19558 A1 | 7/1995 |
| WO | 03/048716 A1 | 6/2003 |
| WO | 03/048717 A1 | 6/2003 |

* cited by examiner

SYSTEM AND METHOD FOR OPTICAL READING OF MARKINGS PRINTED ON A FACE OF AN OPHTHALMIC LENS

The invention relates to the general field of the marking of ophthalmic lenses, and in particular to optical systems and methods for reading marks printed on a face of an ophthalmic lens.

The manufacturing processes generally employed to obtain a finished lens trimmed to the shape of a particular frame typically comprise steps in which the surface of the ophthalmic lens is marked with marks.

For example, the lens may be marked with points or crosses indicating a particular point (for example the optical center of the ophthalmic lens or the prism reference point for a progressive lens), with axis lines (for example indicating the horizontal axis along which astigmatism is corrected) and with shapes bounding particular zones (for example a near vision zone or a far vision zone in the case of progressive ophthalmic lenses).

Likewise, it may be necessary to produce marks allowing the ophthalmic lens to be identified, or other commercial marks.

These marks are generally produced by micro-etching or are printed marks, called temporary marks (often yellow in color).

Processes for producing printed marks on ophthalmic lenses are known from French patent application FR 2 871 100.

All these markings require centering operations that generally end with a centering and driving (or positioning) pin being positioned, often manually, on the ophthalmic lens, this pin subsequently allowing the lens (also called a glass) to be correctly positioned in a machine for trimming or surfacing this lens.

It is necessary, before or after an operation for, for example, trimming the lens, for the printed marks and/or the micro-etchings to be correctly positioned on the ophthalmic lens.

French patent application FR 2 825 466 describes a device for automatically detecting features of an ophthalmic lens, especially printed marks and/or micro-etchings, comprising an image capturing device, a light source and a holder for receiving the ophthalmic lens. The image capturing device, the light source and the holder are configured so that, when the ophthalmic lens is received by the holder, the light source illuminates the lens, thereby making the marks visible to the image capturing device.

The aim of the invention is to provide an optical system for reading marks printed on a face of an ophthalmic lens, which system is even more effective, and is simple and easy to implement and economical.

Thus, one subject of the invention, in a first aspect, is an optical system for reading marks printed on a face of an ophthalmic lens, said system comprising:
- an image capturing device;
- a light source; and
- a holder for receiving said ophthalmic lens;

with said image capturing device and said light source and said holder being configured so that, when said ophthalmic lens is received by said holder, said light source illuminates said lens, thereby making said marks visible to said image capturing device; characterized in that said system furthermore comprises a movable element to which said light source is fastened, which movable element has a working position in which said movable element at least partially encircles said holder and in which said light source faces said holder, and a retracted position in which said movable element is located a distance away from said holder, with said light source and said holder being configured so that, in said working position, when said ophthalmic lens is received by said holder with a masking element that covers said marks, said light source illuminates an edge face of said lens so that the light penetrates into a bulk of said lens and reaches said masking element through said lens.

The optical reading system according to the invention allows the image capturing device to determine a possible discrepancy between the holder configured to receive the ophthalmic lens and the marks printed on this lens.

Knowledge of this possible discrepancy makes it possible to determine whether this holder is correctly centered relative to the ophthalmic lens, in particular here relative to the printed marks.

Therefore, the optical reading system according to the invention makes it possible to determine whether the printed marks are correctly positioned relative to a reference point of the ophthalmic lens.

Depending on the result obtained, i.e. on the value of the possible discrepancy, the system may generate an alarm representative of information relating to the (translational, rotational, or radial distance) discrepancy, or even take corrective measures directly in cooperation with a trimming or surfacing machine.

In the case where the ophthalmic lens is also marked with micro-etchings, and a possible discrepancy between these micro-etchings and the printed marks on the same ophthalmic lens is detected, it is then possible, by virtue of the discrepancy that it is possible to read by virtue of the reading system according to the invention, to deduce a possible discrepancy between the holder configured to receive the ophthalmic lens and its micro-etchings.

Knowledge of these possible discrepancies, signifying a poor positioning of the printed marks on the lens, even of the lens on the holder, or even of the printed marks relative to the micro-etchings on the lens, is particularly advantageous for defining, or redefining, trimming or surfacing parameters (in other words machining parameters) depending on the offset that these possible discrepancies represent.

It will be noted that the optical reading system according to the invention allows marks printed on the face of the ophthalmic lens to be read even when this lens is received in the holder and the printed marks are masked.

Specifically, in the working position, it is possible for the printed marks to be read despite the masking element by backscattering of the light, the backscattered light being captured by the image capturing device.

It will also be noted that in the retracted position the movable element is configured so that it is possible to place the lens on the holder in a preset position, or to remove the lens from the holder.

Of course, it is on the basis of knowledge of the position of the image capturing device and of the holder configured to receive the ophthalmic lens relative to each other that the optical reading system according to the invention is able to determine a possible discrepancy between the printed marks and this holder.

According to preferred, simple, practical and economical features of the optical reading system according to the invention:
- said light source is formed by at least one lighting strip that is inclined relative to said edge face of said lens depending on a general inclination of said face of said lens provided with said printed marks;

said light source is formed by two lighting strips arranged facing each other and on either side of said face of said lens provided with said printed marks;

said light source is formed by an annular lighting strip arranged around said lens;

said image capturing device is formed by a video camera provided with an objective and a sensor configured to capture the light originating from said light source and backscattered by said masking element;

said holder, in order to receive said ophthalmic lens, comprises a clamping clip having an open position and a closed position and comprising a receiving space provided to receive said ophthalmic lens when said clip is in its open position;

said holder, in order to receive said ophthalmic lens, comprises a receiving space provided to receive at least partially a positioning and centering pin to which is fastened said ophthalmic lens, with said masking element being interposed between said pin and said lens;

it furthermore comprises a reference test pattern provided for calibrating said image capturing device;

said masking element is formed by an opaque film configured to at least partially cover said face of said lens provided with said printed marks;

it furthermore comprises a frame having a base on which said holder rests in order to receive said lens, and a back wall connected to said base and on which said image capturing device is mounted, and with said movable element being mounted on said frame; and/or it furthermore comprises a cover having a stationary element and said movable element translationally movable relative to said stationary element, with said cover having opaque walls.

Another subject of the invention, in a second aspect, is an optical method for reading marks printed on a face of an ophthalmic lens, using a system such as described above, comprising the following steps:

providing an ophthalmic lens having on a face printed marks covered with a masking element;

in a retracted position of a movable element of said system, in which position said movable element is located a distance away from a holder of said system in order to receive said lens, introducing said lens at least partially into said holder;

moving said movable element from its retracted position to a working position in which a light source of said system, which light source is borne by said movable element, is brought near to an edge face of said lens;

activating said light source in order to illuminate said edge face of said lens so that the light penetrates into a bulk of said lens and reaches said masking element through said lens; and capturing, via an image capturing device of said system, said light that is backscattered by said masking element.

The method according to the invention is particularly effective, simple, practical and economical.

According to other preferred, simple, practical and economical features of the method according to the invention:

it furthermore comprises the following steps: determining, from the image capture, a value of a positioning discrepancy between said marks printed on said face of said lens and said holder; comparing said determined discrepancy value to a preset discrepancy threshold value; and generating characterizing information for an alarm when the determined discrepancy value is higher than or equal to the preset discrepancy threshold value;

said discrepancy value is representative of a translational distance and/or a rotational distance and/or a radial distance; and/or said discrepancy value is representative of a combination of at least two of said translational, rotational and radial distances.

By virtue of the invention, it is possible to redefine trimming or surfacing parameters to take account of the offset represented by the discrepancy between the printed marks and the holder of the lens, which discrepancy is determined by the method described above.

Figure 2:
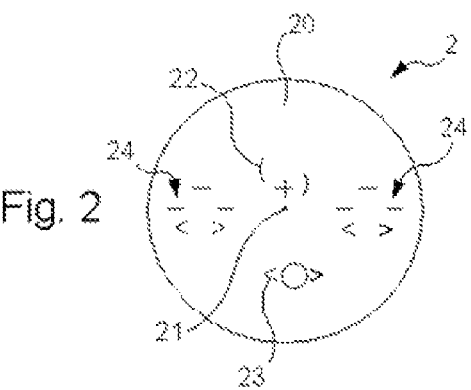
Figure 3:
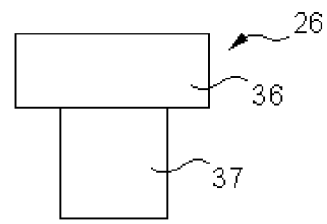
Figure 4:
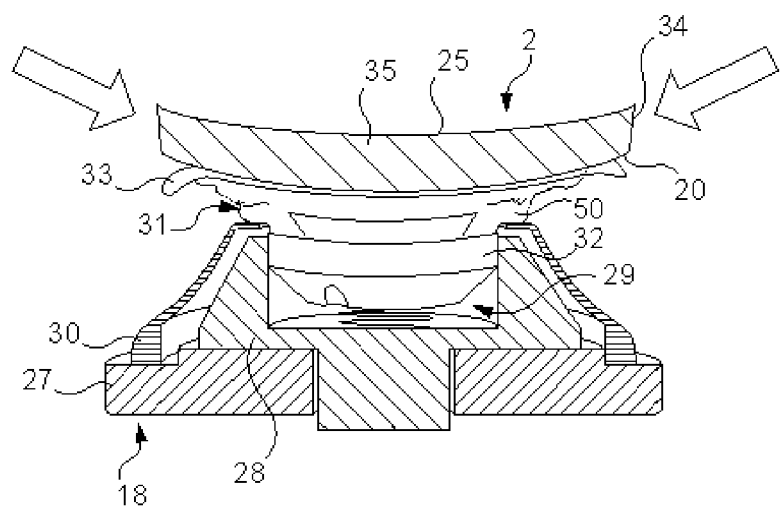
Figure 4:
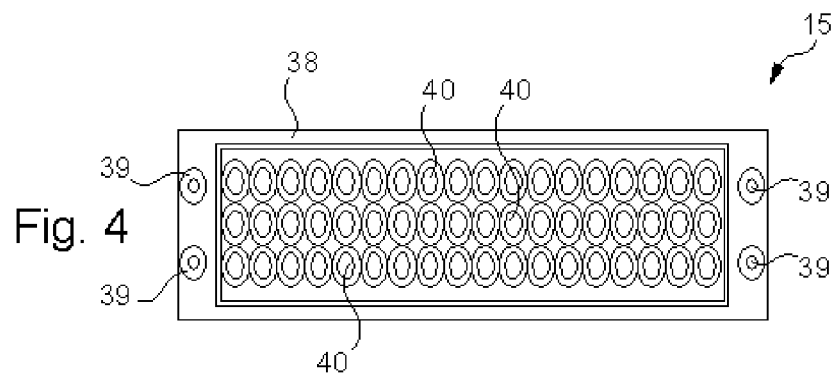
Figure 5:
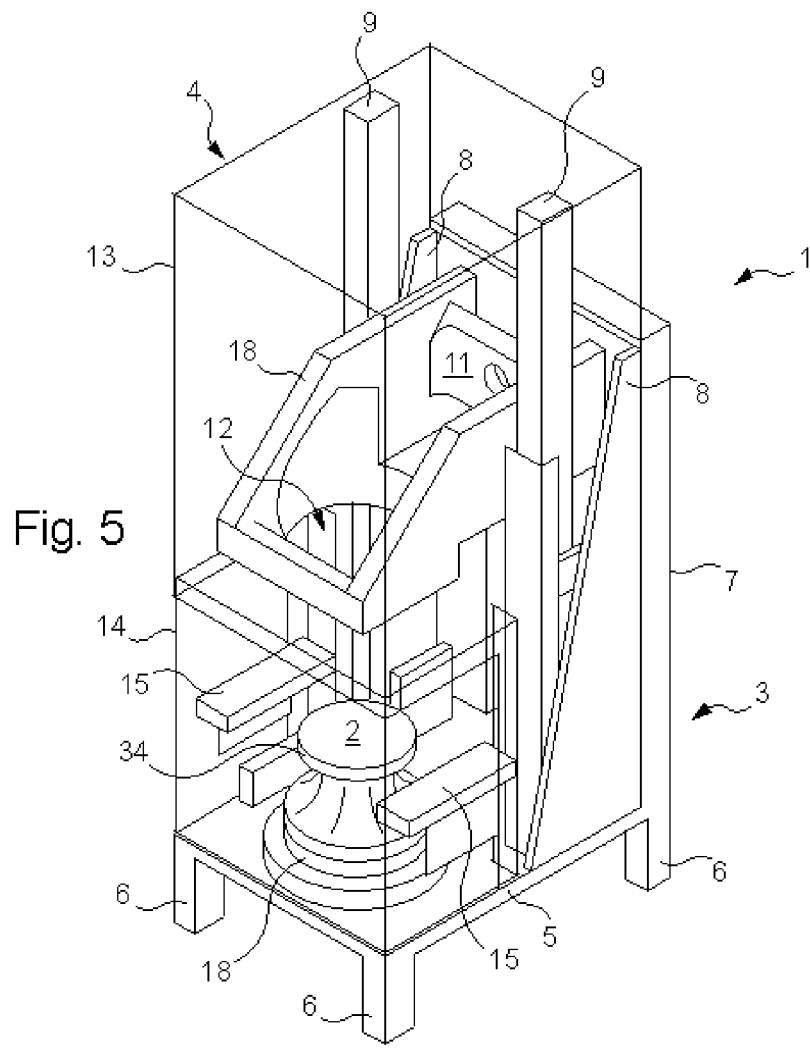
Figure 6:
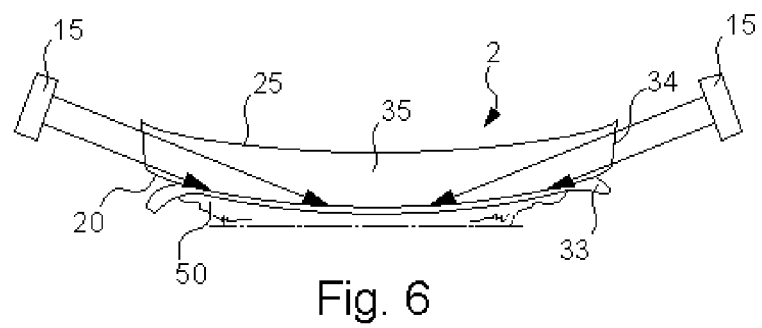
Figure 7:
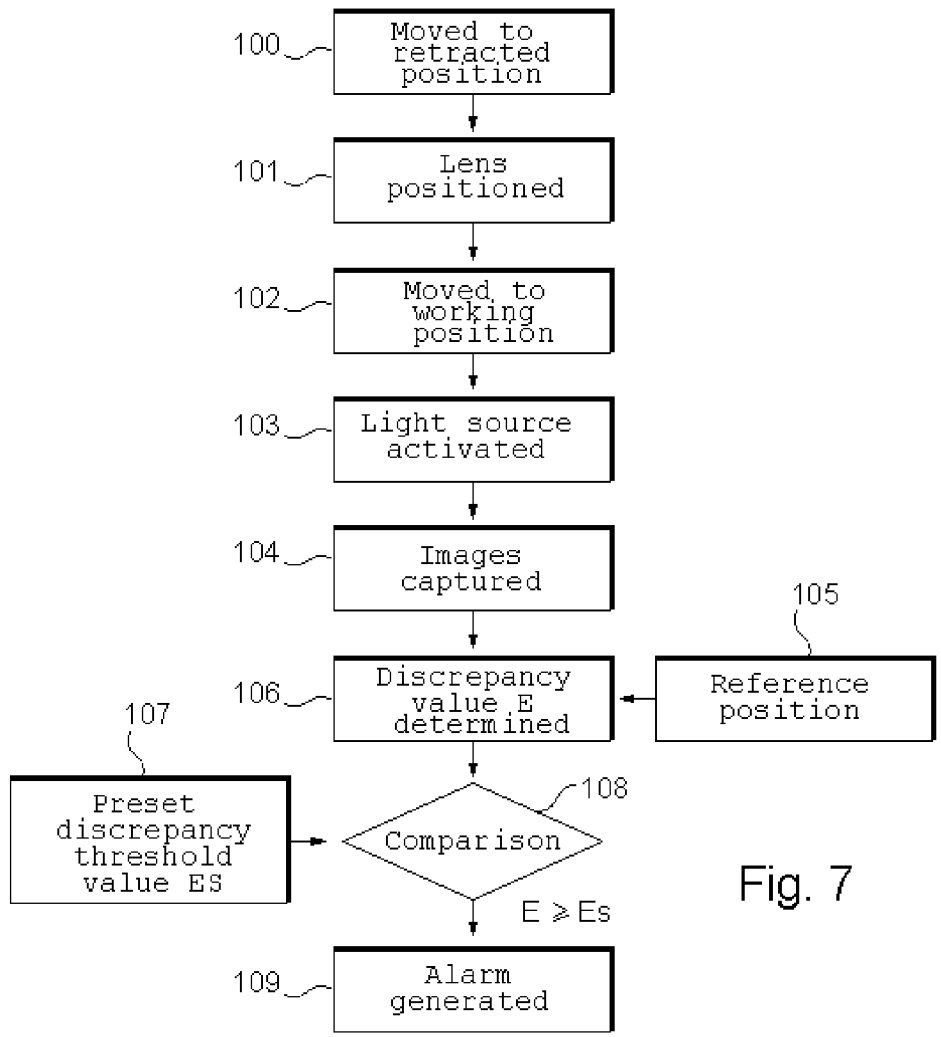
Figure 8:
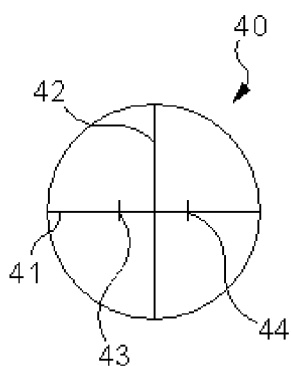

The demonstration of the invention will now continue with a description of an embodiment, given below by way of illustration and nonlimiting example, and with reference to the appended drawings in which:

FIG. 1 schematically and partially shows in perspective an optical system for reading marks printed on a face of an ophthalmic lens, comprising a movable element in its retracted position;

FIG. 2 schematically shows a top view of the ophthalmic lens illustrated in FIG. 1;

FIG. 3 schematically and partially shows in cross section a schematic of the operating principle of the system according to the invention, depicting an image capturing device, a holder on which the ophthalmic lens is mounted and light sources, belonging to the system illustrated in FIG. 1;

FIG. 4 schematically shows a front view of a light source of the system illustrated in FIG. 1;

FIG. 5 schematically and partially shows in perspective the system illustrated in FIG. 1 with the movable element in its working position;

FIG. 6 schematically and partially shows in cross section the system illustrated in FIG. 5 with the light sources activated;

FIG. 7 is a block diagram illustrating various operating steps of an optical method for reading printed marks, implemented by the system illustrated in FIGS. 1 and 5; and FIG. 8 is a schematic plan view of a reference test pattern for calibrating the image capturing device shown in FIG. 3.

FIG. 1 partially illustrates an optical system 1 for reading marks (visible in FIG. 2) printed on an ophthalmic lens 2, also called a glass. Here it is a question of a semi-finished glass 2 before an operation for surfacing the latter.

The system 1 comprises a frame 3 and a cover 4 that is slidably mounted on this frame 3.

The frame is provided with a lower base 5 having four feet 6 (only three of which may be seen in FIG. 1), a back wall 7 extending perpendicularly to the lower base 5, and two set-square-shaped connecting plates 8 that are connected both to the back wall 7 and the lower base 5.

The system 1 furthermore comprises two guiding rods 9 each mounted on the lower base 5 and extending opposite the back wall 7.

The system 1 furthermore comprises a stationary structure 10 that is mounted on the back wall 7 opposite the lower base 5 and that is interposed between the two rods 9.

This structure 10 forms a holder for an image capturing device (shown in FIG. 3).

For this purpose, the structure 10 comprises a mounting plate 11 arranged against the back wall 7 and a window 12 opened toward the lower base 5 and jutting out from the back wall 7.

The cover 4 is provided with a stationary element 13 and a movable element 14.

The stationary element 13 is mounted on the back wall 7 and on the side walls 8 and the movable element 14 is mounted to slide translationally over the guiding rods 9 and is movable relative to the stationary element 13.

The movable element 14 is configured to have a retracted position, shown in FIG. 1, in which the movable element 14 is at least partially introduced into an internal space of the stationary element 13 of the cover 4.

The movable element 14 is furthermore configured to have a working position (shown in FIG. 5) in which the movable element 14 is deployed, i.e. no longer in the stationary element 13.

In its working position, the movable element 14 is closer to the lower base 5 than in its retracted position.

Furthermore, the system 1 comprises two light sources 15 here formed by light-emitting diode (LED) lighting strips.

These lighting strips 15 are each fastened to an internal face of one side 16, 17 of the movable element 14.

The sides 16 and 17 on which the lighting strips 15 are fastened are opposite each other and arranged on either side of the structure 10, so that these strips 15 are each located substantially facing a guiding rod 9.

The lighting strips 15 are arranged inclined (as may be seen in FIG. 6) relative to these sides 16 and 17 of the movable element 14 of the cover 4.

Furthermore, the system 1 comprises a holder 18 for receiving the ophthalmic lens 2.

This holder 18 is mounted on the lower base 5 and is configured so that the ophthalmic lens 2 is arranged facing the window 12 of the structure 10 in which the image capturing device is mounted.

FIG. 2 shows a top view of the ophthalmic lens 2 by itself.

This ophthalmic lens 2 has a concave face, not shown in FIG. 2, and a convex face 20 that is provided with printed marks 21 to 24 that are also called temporary marks.

These marks respectively indicate a reference point 21 located at the center of the lens 2, a far vision zone 22 located just above the reference point 21, a near vision zone 23 located below the reference point 21 and a zone 24 extending along a horizontal axis called the nose-ear axis.

The configuration of the holder 18 with the lens 2 relative to the image capturing device 26 and relative to the light originating from the lighting strips 15 when the movable element 14 is in its working position will now be described in greater detail with reference to FIG. 3.

The holder 18 is provided with a base 27 and a clamping clip 28 forming a ring having a receiving space 29 in its center.

This holder 18 is furthermore provided with a protective jacket 30 at least partially covering the clamping clip 28.

Here, the ophthalmic lens 8 is mounted on a positioning and centering pin 31 forming a holder.

This positioning and centering pin is provided with a lower portion 32 intended to be received in the receiving space 29 of the clip 28, and an upper portion 50 configured to closely follow substantially and at least partially the shape of the convex face 20 of the ophthalmic lens 2.

A masking element, here formed by an opaque film 33, is interposed between this convex face 20 of the lens 2 and the upper portion 50 of the positioning and centering pin 31.

This opaque film 33 partially covers the convex face 20 and masks the printed marks 21 to 24 produced on this convex face 20.

Here it will be noted that the lens 2 has a (peripheral) edge face 34 that here is exposed.

The lens 2 furthermore comprises a volume of material defined by the edge face 34 and the two faces 20 and 25, which here is referred to as the bulk 35 of this lens 2.

The clamping clip 28 of the holder 18 is configured to have an open position in which it may at least partially receive the lower portion 32 of the positioning and centering pin 31, and a closed position in which it holds this lower portion 32 and thus immobilizes the assembly formed by the positioning and centering pin 31, the opaque masking film 33 and the ophthalmic lens 2.

FIG. 3 also shows the image capturing device 26 that here is formed by a video camera provided with a charge-coupled device (CCD) sensor 36, and an objective 37.

This video camera 36 is configured to be mounted, as indicated above, on the structure 10 and in particular on the mounting plate 11 and is configured to be positioned with its objective 37 level with the window 12 and facing the concave face 25 of the ophthalmic lens 2.

Light beams are also shown in FIG. 3, these light beams being illustrated by arrows pointing in a preset direction that shows the direction of propagation of the beams originating from the two lighting strips 15 before they reach the ophthalmic lens 2, and in particular the edge face 34 of this lens 2.

It may be seen in FIG. 3 that the lighting strips 15 are inclined because the arrows are inclined. This inclination depends on the general inclination of the convex face 20.

It will be seen in greater detail how the light beams originating from the lighting strips 15 propagate in the bulk 35 of the lens 2 with reference to FIGS. 5 and 6.

FIG. 4 illustrates a front view of a lighting strip 15.

This lighting strip has a rectangular parallelepipedal shape and comprises a frame 38 provided with fastening members 39 provided for fastening this lighting strip 15 to a side 16 or 17 of the movable element 14.

Furthermore, this frame 38 defines a space in which a plurality of light-emitting diodes 40 are introduced, these light-emitting diodes 40 here being aligned and uniformly distributed in three rows.

The optical reading system 1 when the movable element 14 is in its working position will now be described with reference to FIGS. 5 and 6.

In contrast to the retracted position, in which the movable element 14 of the cover 4 is located a distance away from the holder 18 (FIG. 1), in its working position this movable element 14 covers and even completely or almost completely shields the holder 18 and therefore the ophthalmic lens 2 and the space in the immediate vicinity of this holder 18.

Since the lighting strips 15 are fastened to the movable element 14 of the cover 4, moving this movable element 14 causes, by way of consequence, the lighting strips 15 to move until the latter are positioned facing the edge face 24 of the lens 2. Thus, the two lighting strips 15, which are located opposite each other, partially encircle, or cover, the edge face 34 of the lens 2.

The system 1 is configured in such a way that, when the movable element 16 is in its working position, and when the lens 2 is received in the holder 18, these lighting strips 15 are located in the immediate vicinity of, i.e. as close as possible to, the edge face 34 of the lens 2 so that the light beams originating from the lighting strips 15 penetrate into the bulk 35 of the lens 2 via the edge face 34.

It will be noted that in the working position of the movable element 14 the interior of the system 1, in other words the internal space of the cover 4, is completely or almost completely dark (as seen from outside of the system 1).

This is due to the fact that the sidewalls of the cover 4, and in particular of its stationary element 13 and of its movable element 14, are opaque, in order to plunge the lens 2 completely or almost completely into darkness so that, as shown below, the light is backscattered by the opaque masking film 33 and this backscattered light is as visible as possible to the video camera 26.

It is particularly clear in FIG. 6 that the lighting strips 15 are arranged inclined relative to the edge face 34 of the lens 2 and that these lighting strips 15 are located facing and in the immediate vicinity of this edge face 34.

The light beams emitted by these lighting strips 15 (represented here by arrows) are diffuse such that the light originating from these lighting strips 15 passes through the edge face 34 and penetrates into the bulk 35 of this lens 2.

The fact that the light sources 15 are near the edge face 34 of the lens 2 allows the space surrounding the holder 18 and bounded by the cover 4 not to be illuminated by the lighting strips 15.

Thus, all or almost all of the light beams originating from the lighting strips 15 penetrate into the bulk 35 of the lens in order to be backscattered by the opaque masking film 33 interposed between the convex face 20 of the lens 2 and the upper portion 50 of the positioning and centering pin 30.

It will be noted that in the embodiment illustrated, the system 1 is provided with two lighting strips 15 located on either side of the lens 2 (i.e. the strips 15 are opposite each other) so that it is possible for the light that penetrates into the bulk 35 of the lens 2 to propagate about as far as half the diameter of this lens 2 in a downward direction traced from the edge face 34 to the convex surface 20 of this lens 2.

As the light penetrating into the bulk 35 of the lens 2 is backscattered by the masking film 33, the light rays shown in FIG. 6 simply follow a downward direction and are not, or are almost not, reflected inside the bulk 35 of the lens.

It will also be noted that the configuration of the lighting strips 15 relative to the ophthalmic lens 2 allows the latter to be illuminated with light at a shallow angle.

As indicated above, especially with reference to FIG. 3, the objective 37 of the video camera 26 faces the ophthalmic lens and therefore sees the light backscattered by the masking film 33.

Thus, one or more images of this backscattered light may be captured by this video camera 26.

Therefore, since the printed marks 21 to 24 are produced on the convex face 20 of the lens 2, which face is illuminated by the lighting strips 15 the light of which is backscattered by the masking element 33, these printed marks 21 to 24 are also backscattered and therefore seen by the video camera 26, and therefore the image of these printed marks 21 to 24 is captured by this video camera 26.

The operating steps of the method implemented by the system 1 described above will now be described with reference to FIG. 7.

A user desiring to check that the printed marks 21 to 24, called temporary marks, are correctly positioned relative to the centering and positioning pins 31 and more generally relative to the holder 18 configured to receive the lens 2, will use the system 1 described above in the following way.

The user moves, in a step 100, the movable element 14 of the cover 4 in order to place it into its retracted position in order to gain free access to the lower base 5 of the frame 3 and more particularly to the holder 18.

The user ensures that the clamping clip 28, which forms a receiving ring, is in its open position.

The user provides the ophthalmic lens 2, mounted on the positioning and centering pin 31, with the opaque masking film 33 interposed between the convex face 20 of the lens 2 and the upper portion 50 of the pin 31.

In a step 101, the user at least partially inserts the lower portion 32 of the pin 31 into the receiving space 29 of the clamping clip 28 and puts the latter into its closed position in order to immobilize the assembly formed by the pin 31, the masking film 33 and the lens 2.

Here, the system 1 knows the position of the holder 18 and in particular the position of the clamping clip 28, and therefore the system knows the position of the positioning and centering pin 31 clamped in the clip 28.

Once the lens 2 has been positioned, the latter therefore has its convex face 20, which face is provided with printed marks 21 to 24, located facing the holder 18 (with the printed marks 21 to 24 masked by the opaque film 33) and its concave face 25 located facing and a distance away from the video camera 26.

Next, in a step 102, the user moves the movable element 14 from its retracted position to its working position, i.e. he/she translates the movable element 14 downward along the guiding rods 9 whereas the stationary element 13 remains in position.

This movable element 14 is therefore moved until it completely, or almost completely, shields the holder 18 and its immediate environment so that the internal space bounded by the cover 4, and the lens 2 and the lighting strips 15 found therein, are plunged completely into darkness.

Next, the user activates, in step 103, the lighting strips 15 so that they diffuse light, as indicated above.

The light originating from these lighting strips 15 and penetrating into the bulk 35 of the lens 2 is backscattered, then the image of this light is captured in step 104 by the video camera 26 that is itself arranged inside the cover 4.

The one or more images captured in step 104 are sent to a command/control unit (not shown, but that may be integrated into the video camera 26) in order for the same unit to determine in step 106 a discrepancy value E from a reference position received beforehand in step 105.

This reference position is based on the fact that, as indicated above, the video camera 26 knows the position of the holder 18 and therefore of the positioning and centering pin 31 when the latter is clamped in the clamping clip 28.

The discrepancy value E corresponds to a possible positioning discrepancy between the printed marks 21 to 24 and the positioning and centering pin 31 on which said ophthalmic lens 2 is mounted before its surfacing.

This discrepancy value E is representative of a translational distance and/or a rotational distance and/or a radial distance, whether stated independently (plurality of variables) or in combination (single variable).

The command/control unit is furthermore configured to receive, in step 107, a preset discrepancy threshold value ES, then to compare, in step 108, this discrepancy threshold value ES to the discrepancy value E determined in step 106.

If the result of the comparison carried out in step 108 is that the discrepancy value E determined in step 106 is higher than or equal to the discrepancy threshold value ES, then the command/control unit generates an alarm in step 109 in order to indicate that there is an error in the position of the printed marks 21 to 24 relative to the positioning and centering pin 31.

This alarm in fact consists of characterizing information used to format a light signal or a message for example, or that directly provides corrective measures to be transmitted to a surfacing machine making it possible for the latter to redefine surfacing parameters to take account of the detected positioning error.

The message may be displayed on a screen (not shown) of the system 1 or recorded by the command/control unit then stored in a database. If required, it is in fact the value of the translational and/or rotational and/or radial distance discrepancy (or a combination of these distance values) that is recorded and stored.

This message, or this discrepancy value, may then be sent to a surfacing or trimming machine via a client/server communication interface (not shown) comprising a side called the provider side and another side called the client side, these two sides communicating via a network or Internet interface.

The provider side comprises a server connected to the command/control unit of the system 1 and this server is configured to communicate with the network or Internet interface.

The client side is configured to communicate with the network or Internet interface and is connected to a command/control unit of the same type as that of the provider side; and the latter client-side command/control unit is connected to the surfacing (or trimming) machine.

The provider-side unit sends, via the server and the network or Internet interface, the message or discrepancy value to the client-side unit.

Detection of a discrepancy between the printed marks 21 to 24 and the positioning and centering pin 31 is particularly simple to detect, even to transmit, by virtue of the optical reading system and method described above.

Furthermore, the method is particularly simple to implement and the system is particularly easy to use.

The optical reading system and method such as described above therefore allow a user to be made aware of any possible discrepancy that exists between these printed marks 21 to 24 and the pin 31, in order to allow surfacing parameters to be redefined before the actual surfacing operation.

As a variant (illustrated), the video camera 26 does not know exactly where the holder 18 is positioned, and therefore does not know the position of the positioning and centering pin 31.

If required, a test pattern 40 illustrated in FIG. 8, resembling a target, is arranged in the space 29 bounded by the clamping clip 28, under the positioning and centering pin 31, and a calibration is carried out by virtue of horizontal 41 and vertical 42 reference lines, and by virtue of reference markers 43 and 44 marked on this test pattern 40.

As variants (not illustrated):
it is not a question of checking the position of the printed marks relative to the positioning and centering pin before surfacing of the lens, but rather before, even after, trimming of this lens; when this check is carried out after trimming, it makes it possible to check whether during trimming the positioning and centering pin has moved rotationally (trimming of the periphery of the lens may cause it to become misaligned, which misalignment is then related to slippage of an element secured to the pin for the purpose of trimming of this lens);
the video camera is not arranged in the same position all the time and, depending on the circumstances, a calibration might be necessary each time it is used in order to determine the position of this video camera relative to the holder for receiving the lens;
the light source does not comprise two LED lighting strips, but more or fewer strips, even one annular strip encircling the entire edge face of the lens;
the light source is not inclined relative to the edge face of the lens but rather parallel to the latter;
the light source is not in immediate proximity to the edge face of the lens (i.e. at a relatively small distance away from the edge face of the lens) but is rather placed directly against this edge face;
the masking element is not an opaque film but rather a jacket allowing the face on which the marks are printed to be covered;
the side walls of the cover are not opaque but rather tinted, relatively dark, or even transparent.
the printed marks are not produced on the convex face of the lens but rather on the concave face of this lens; more generally, the printed marks are produced on the front and/or back face of a lens;
a calibration is required for the prismatic deviation due to the diopter at the interface between the material of the lens and the face placed facing the video camera; this calibration may be carried out by deduction by processing of the image seen by the video camera, for example by virtue of the distance between various lines of one of the printed marks 22 to 24 or even by transmission via a Hartmann matrix; and/or
the optical reading system is different from that shown in FIGS. 1 and 5, it does not comprise a frame or a cover but is simply a tripod on which, optionally, a positioning and centering pin is automatically positioned.

More generally, it will be recalled that the invention is not limited to the examples described and shown.

The invention claimed is:

1. An optical system for reading marks printed on a face (20) of an ophthalmic lens (2), said system (1) comprising:
an image capturing device (26);
a light source (15); and
a holder (18, 31) for receiving said ophthalmic lens (2);
with said image capturing device (26) and said light source (15) and said holder (18, 31) being configured so that, when said ophthalmic lens (2) is received by said holder (18, 31), said light source (15) illuminates said lens (2), thereby making said marks (21-24) visible to said image capturing device (26);
characterized in that said system (1) furthermore comprises a movable element (14) to which said light source (15) is fastened, which movable element (14) has a working position in which said movable element (14) at least partially encircles said holder (18) and in which said light source (15) faces said holder (18, 31), and a retracted position in which said movable element (14) is located a distance away from said holder (18, 31), with said light source (15) and said holder (18, 31) being configured so that, in said working position, when said ophthalmic lens (2) is received by said holder (18, 31) with a masking element (39) that covers said marks (21-24), said light source (15) illuminates an edge face (34) of said lens (2) so that the light penetrates into a bulk (35) of said lens (2) and reaches said masking element (33) through said lens (2).

2. The system as claimed in claim 1, characterized in that said light source is formed by at least one lighting strip (15) that is inclined relative to said edge face (34) of said lens (2) depending on a general inclination of said face (20) of said lens (2) provided with said printed marks (21-24).

3. The system as claimed in claim 2, characterized in that said light source is formed by two lighting strips (15) arranged facing each other and on either side of said face (20) of said lens (2) provided with said printed marks (21-24).

4. The system as claimed in claim 1, characterized in that said light source is formed by two lighting strips (15)

arranged facing each other and on either side of said face (20) of said lens (2) provided with said printed marks (21-24).

5. The system as claimed in claim 1, characterized in that said light source is formed by an annular lighting strip arranged around said lens.

6. The system as claimed in claim 1, characterized in that said image capturing device is formed by a video camera (26) provided with an objective (37) and a sensor (36) configured to capture the light originating from said light source (15) and backscattered by said masking element (33).

7. The system as claimed in claim 1, characterized in that said holder, in order to receive said ophthalmic lens, comprises a clamping clip (28) having an open position and a closed position and comprising a receiving space (29) provided to receive said ophthalmic lens (2) when said clip (28) is in its open position.

8. The system as claimed in claim 1, characterized in that said holder, in order to receive said ophthalmic lens, comprises a receiving space (29) provided to receive at least partially a positioning and centering pin (33) to which is fastened said ophthalmic lens (2), with said masking element (33) being interposed between said pin (31) and said lens (2).

9. The system as claimed in claim 1, characterized in that it furthermore comprises a reference test pattern (40) provided for calibrating said image capturing device (26).

10. The system as claimed in claim 1, characterized in that said masking element is formed by an opaque film (33) configured to at least partially cover said face (20) of said lens (2) provided with said printed marks (21-24).

11. The system as claimed in claim 1, characterized in that it furthermore comprises a frame (3) having a base (5) on which said holder (18, 31) rests in order to receive said lens (2), and a back wall (7) connected to said base (5) and on which said image capturing device (26) is mounted, and with said movable element (14) being mounted on said frame (3).

12. The system as claimed in claim 11, characterized in that it furthermore comprises a cover (4) having a stationary element (13) and said movable element (14) translationally movable relative to said stationary element (13), with said cover (4) having opaque walls.

13. An optical method for reading marks printed on a face (20) of an ophthalmic lens (2), using a system (1) as claimed in claim 1, said method comprising the following steps:

providing an ophthalmic lens (2) having on a face (20) printed marks (21-24) covered with a masking element (33);

in a retracted position of a movable element (14) of said system (1), in which position said movable element (14) is located a distance away from a holder (18, 31) of said system (1) in order to receive said lens (2), introducing (101) said lens (2) at least partially into said holder (18, 31);

moving (102) said movable element (14) from its retracted position to a working position in which a light source (15) of said system (1), which light source (15) is borne by said movable element (14), is brought near to an edge face (34) of said lens (2);

activating (103) said light source (15) in order to illuminate said edge face (34) of said lens (2) so that the light penetrates into a bulk (35) of said lens (2) and reaches said masking element (33) through said lens (2); and capturing (104), via an image capturing device (26) of said system (1), said light that is backscattered by said masking element (33).

14. The optical reading method as claimed in claim 13, characterized in that it furthermore comprises the following steps:

determining (106), from the image capture, a value of a positioning discrepancy (E) between said marks (21-24) printed on said face (20) of said lens (2) and said holder (18, 31);

comparing (108) said determined discrepancy value (E) to a preset discrepancy threshold value (ES); and generating (109) characterizing information for an alarm when the determined discrepancy value (E) is higher than or equal to the preset discrepancy threshold value (ES).

15. The optical reading method as claimed in claim 14, characterized in that said discrepancy value (E) is representative of a translational distance and/or a rotational distance and/or a radial distance.

16. The optical reading method as claimed in claim 15, characterized in that said discrepancy value (E) is representative of a combination of at least two of said translational, rotational and radial distances.

* * * * *